H. J. GENTZSCH, Sr.
Plow.
No. 207,960. Patented Sept. 10, 1878.
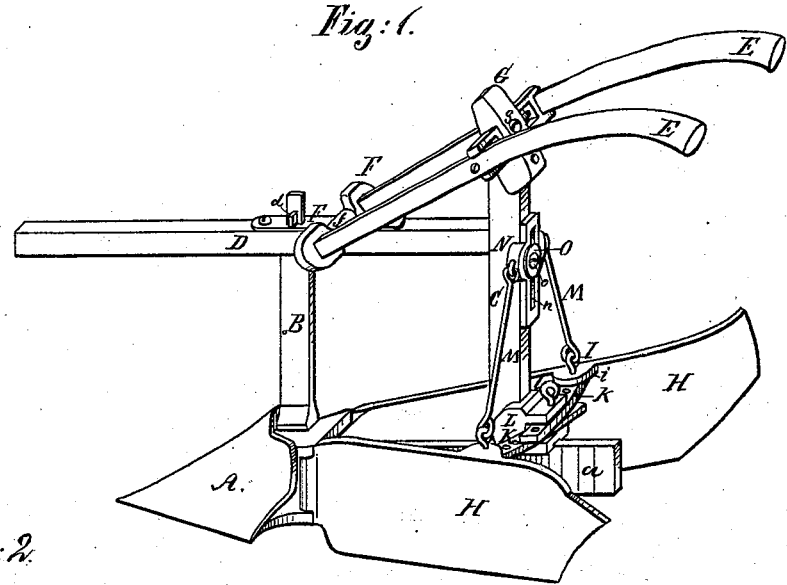
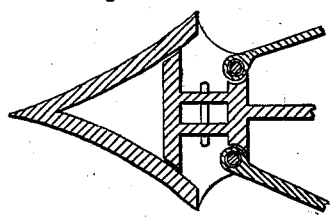
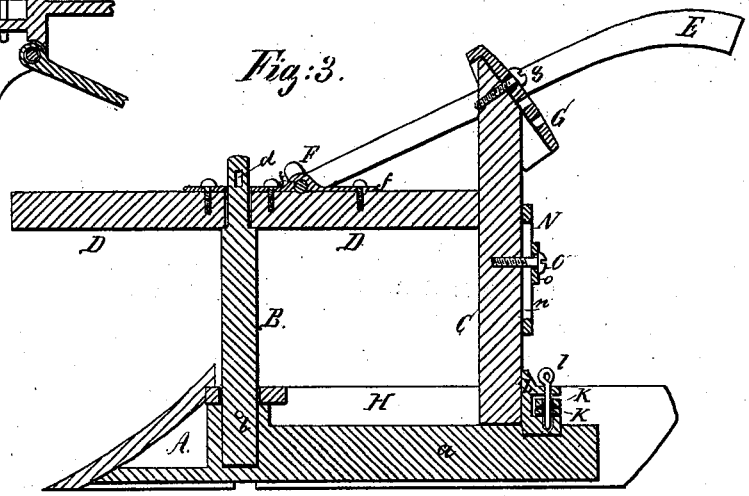
Witnesses.
E. Jessen.
Emil H. Frommann
Inventor.
Henry J. Gentzsch
By Wm. H. Lotz
Attorney

UNITED STATES PATENT OFFICE.

HENRY J. GENTZSCH, SR., OF CHICAGO, ILLINOIS.

IMPROVEMENT IN PLOWS.

Specification forming part of Letters Patent No. 207,960, dated September 10, 1878; application filed July 18, 1878.

*To all whom it may concern:*

Be it known that I, HENRY J. GENTZSCH, Sr., of Chicago, in the county of Cook and State of Illinois, have invented certain new and useful Improvements in Plows, of which the following is a full and accurate description, reference being had to the accompanying drawings, forming part of this specification, in which—

Figure 1 represents a perspective side view of the plow; Fig. 2, a sectional plan of the plowshare and the front portion of the mold-boards, and Fig. 3 represents a vertical longitudinal section through the center of the plow.

The nature of my invention relates to a double-mold-board plow, intended for tending growing crops; and it is my object to construct the same so as to destroy the weeds therewith between the rows of plants, and for hilling up the crop independently of the distance the rows are apart.

My invention consists in the peculiar means for adjustably connecting the mold-boards which are pivoted to the double share to the rear standard.

A is a double-breasted plowshare, which may be cast in a single piece or may be composed of sections, having a rearward-extending central beam, *a*. B is the sheth, being secured in a suitable socket in the share by a key, *b*. C is the stilt-post, the lower end of which is slotted and placed over the rear portion of the share-beam *a*, and secured thereto by a rivet or bolt. D is the draft-beam, the rear end of which is framed into the stilt-post, and the upper end of the sheth B, being formed into a tenon, is passed through a slot in said beam D, and is secured therein by a wedge, *d*.

E E are the handles, the front ends of which are fitted into sockets in the ends of a casting, F, the central portion of which is round, and is held to the top of the draft-beam by a cap-plate, *f*, secured upon the said draft-beam by a series of screws or rivets.

G is the yoke, rigidly secured between the middle portion of both handles E. This yoke G is expanded in its middle, and is formed to an arc of a circle struck from the pivot of casting F, and has side and top flanges to cover the upper extremity of the stilt-post C, which is shaped to conform with the curve of the yoke-plate, and to which it is adjustably secured by a screw, *g*, passed through one of a series of holes provided in said plate on a vertical line, and tapped into the stilt-post, whereby the elevation of these handles can be changed to suit different-sized men.

H H are the mold-boards, the forward ends of which are pivoted between the rear sole and top plates of the share A by bolts *h*, while near their rear ends said mold-boards have lugs *i* to their inward faces, holding eye-bolts I, which form the fulcrums for the ends of two perforated curved bars, K, the opposite ends of which are adjustably secured, by overreaching each other, between the flanges of a casting, L, by means of a pin, *l*, passed through holes in said flanges, and through one of the holes in the bars K. This casting L is fixed to the lower portion of the stilt-post C by side flanges clasping the sides of said post, and pierced by a bolt or rivet.

The eye-shaped heads of the bolts I have coupled each the end of a brace-rod, M, the opposite ends of which are pivoted to the side ears of a plate, N, having side flanges for guiding it against the rear face of stilt-post C, against which it is adjustably secured by a bolt, O, passed through the stilt-post, and through a vertical slot, *n*, in said plate N, a washer, *o*, being interposed between said plate and the head of the bolt.

As will be noticed, the bars K will hold the mold-boards H the right distance apart, while the brace-rods M will hold them steady, and will prevent vertical play of the same.

This plow is to be used for tending growing crops planted in rows, for destroying the weeds, and, by throwing the soil right and left, for hilling up the crops. As has been described already, its mold-boards can be expanded or contracted to accommodate it for different width of the furrows, and by removing the mold-boards entirely it can be used as a sub-soil-plow for digging potatoes, for which purpose its double-breasted share has great advantages, since it opens and turns the ground so as to expose the potatoes without reburying or cutting the same. It requires the draft of one horse only, and by its peculiar arrangement for changing the elevation of the handles to suit men or boys, it is under easy control for guiding it.

I am aware that it is not new to provide a double-share plow with adjustable pivoted mold-boards, and I do not pretend to be the inventor of the same.

What I claim as my invention is—

The double share A and the standard C, supported on a rearward extension of such share, in combination with the mold-boards H, pivoted to the share and adjustably connected to the said standard by the lapping perforated bars K, secured in the casting L, and the brace-rods M, attached at their upper ends to the slotted plate N, vertically adjustable on the standard, constructed and arranged substantially as described and shown.

HENRY J. GENTZSCH, SR.

Witnesses:
GEO. FROMMANN,
E. JEBSEN.